United States Patent [19]

Olschewski et al.

[11] Patent Number: 4,696,083

[45] Date of Patent: Sep. 29, 1987

[54] METHOD FOR MAKING MACHINE PARTS AND MACHINE PARTS PRODUCED THEREBY

[75] Inventors: Armin Olschewski, Schweinfurt; Manfred Brandenstein, Eussenheim; Hermann Hetterich, Heidenfeld; Heinrich Kunkel, Schweinfurt, all of Fed. Rep. of Germany

[73] Assignee: SKF GmbH, Schweinfurt, Schweinfurt, Fed. Rep. of Germany

[21] Appl. No.: 795,823

[22] Filed: Nov. 7, 1985

[30] Foreign Application Priority Data

Nov. 9, 1984 [DE] Fed. Rep. of Germany ....... 3440961

[51] Int. Cl.[4] ............................................. B21D 53/12
[52] U.S. Cl. ......................... 29/148.4 C; 29/DIG. 49; 72/379
[58] Field of Search ................... 72/379, 701; 29/148.4 C, DIG. 49; 148/12 R, 12.4

[56] References Cited

U.S. PATENT DOCUMENTS

| 631,159 | 8/1899 | Echols | 72/104 |
| 1,958,025 | 5/1934 | Styri | 148/12.4 |
| 2,184,150 | 12/1939 | Parker et al. | 148/12.4 |
| 3,981,060 | 9/1976 | Alling et al. | 29/148.4 C |
| 4,112,732 | 9/1978 | Okunishi et al. | 72/334 |
| 4,254,540 | 3/1981 | Bilak | 72/379 |
| 4,434,641 | 3/1984 | Nguyen | 72/379 |

Primary Examiner—Lowell A. Larson
Attorney, Agent, or Firm—Eugene E. Renz, Jr.

[57] ABSTRACT

A method for making hardened essentially disk-shaped machine parts particularly rotor disks for axial roller bearings consisting of the steps of forming the disk to the desired shape in the soft state, densifying at least one annular ring-shaped section of the disk by rolling or pressing and thereafter hardening the entire disk.

1 Claim, 1 Drawing Figure

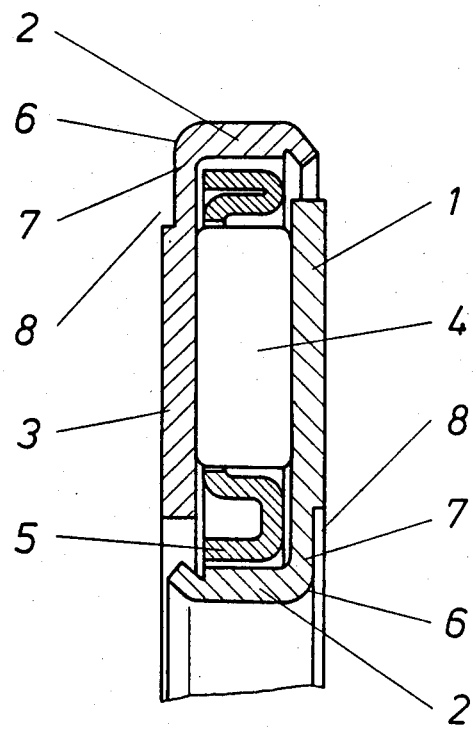

4,696,083

METHOD FOR MAKING MACHINE PARTS AND MACHINE PARTS PRODUCED THEREBY

FIELD OF THE INVENTION

The present invention relates to a method for making hardened, essentially disk-like machine parts such as rotor disks for roller bearings.

BACKGROUND OF THE INVENTION

Hardened, disk-shaped machine parts are frequently used in bearing technology in general. For example, rotor disks for axial roller and sleeve bearings, mounting disks, rings for separating rows of rolling elements and rolling bearings and the like, are usually made from precision steel and are then hardened and finally finished to produce the geometrically dimensioned surfaces within prescribed tolerances. It has been found that during the hardening process and particularly in the cooling phase after hardening, internal stresses develop in the material which produce distortion of the shape which, except for minor deviations, is satisfactory subsequent to soft processing. In view of this deviation it is, therefore, necessary to provide for substantially dimensional allowances in order to arrive at the desired quality by hard processing. It is, therefore, desirable to maintain so-called hardening distortion to a minimum. To achieve this, it has already been proposed that the machine parts be mounted in a die during hardening. This process, however, is extremely expensive since each machine part must be handled individually. As a practical matter, it has been determined that this expense is prohibitive particularly in the case of small machine parts.

West German Pat. No. 2,304,557 also discloses a method for subjecting the surface of steel bars to a pressure polishing process so that they retain their cylindrical shape during hardening. It has been found, however, that when this process is used for disk-shaped, relatively thin machine parts, the results are not satisfactory by reason of the fact that these disks after processing exhibit either a wavy or conical form of distortion.

SUMMARY OF THE INVENTION

With the foregoing in mind, it is an object of the present invention to provide a process for making hardened disk-shaped machine parts wherein during the hardening thereof, distortion is reduced to a minimum. To this end, in accordance with the present invention, a ring-shaped section of material for the rotor disks is densified by rolling or pressing before hardening. In this manner, only a predetermined small, ring-shaped section of material is densified in the cold state. Densifying is a process of cold hardening of a substantial portion of the thickness of the section of material densified. Thus, a densified zone which is more rigid or stiffer than the rest of the material and which forms a closed, ring-shaped area is obtained before hardening and this densified zone, therefore, serves to stiffen or rigidify the entire disk when it is hardened. Accordingly, given the relative thinness of the disk, a relatively large area of the material is encompassed which means that the stiffening relative to the total volume is considerable. It has been shown that the ring-shaped densification according to the present invention produces superior results as compared with total surface densification, particularly in the case of relatively thin disks. The material allowance in the soft state can, therefore, be maintained advantageously so small that for finishing, the expense involved is no more than would have been necessary for surfaces coming straight from hardening which are unsuitable for direct uses bearing parts in any event. Further, for machine parts not subject to extremely strict tolerance requirements, it is often possible to dispense with the finishing operation entirely which is clearly advantageous from an economic standpoint.

In accordance with the present invention, it has been found that especially good results are obtained by densifying a ring-shaped section of material from one edge of the rotor disk, that is starting from the outer radial edge thereof. In this fashion the rotor disk is rigidified or stiffened in the area of its greatest diameter. For example, in rotor disks from a flat sheet, the disk is shaped to provide a circumferentially extending, generally axially directed flange or projection wherein stresses are developed which during the hardening process causes deviations and distortions in the disk. It has been found that densification in localized zones in accordance with the present invention relieves these stresses and, therefore, obviates the deviations and distortions during the hardening step. Thus, the process produces particularly good results especially in rotor disks with a cylindrical projection on the outside since the densification is also effective in the edge area and, thus, includes this projection.

DESCRIPTION OF THE DRAWING

These and other objects of the present invention and the various features thereof are hereinafter more fully set forth with reference to the accompanying drawing, wherein:

FIG. 1 shows a partial longitudinal sectional view through an axial cylindrical roller bearing.

DESCRIPTION OF THE PREFERRED EMBODIMENT

The process of the present invention is particularly useful in making machine parts of the type illustrated consisting of a rotor disk 1 having a radially inwardly directed cylindrical projection 2, a second rotor disk 3 with an outer cylindrical projection 2 and a plurality of cylindrical rollers located therebetween which are guided by means of a conventional cage 5. This roller bearing is suitable for transmitting axial forces. As illustrated, the cylindrical projections 2 overlie the bearing space and serve as centering sections during assembly. Rotor disks 1 and 3 are generally produced of roller bearing steel preferably in sheet form in the soft state by cold working. During formation of the disk in this manner, an annular, ring-shaped section of material 7 is densified under heavy pressure in the cold state proceeding from the edge 6 near the cylindrical projection 2. By this process, a ring-shaped zone having an internal structure stiffer than the rest of the material and a shoulder in the form of a ring-shaped recess 8 are obtained. Thereafter the rotor disks are hardened in a conventional manner and the roller contact surface or seating surfaces are finished by grinding. Densification in accordance with the present invention of localized zones of the disk serves to relieve the stresses which would normally produce deviations and distortions during the hardening of the entire disk.

Even though the method of the present invention is illustrated in connection with a hardened area in the shape of a ring for a particular type of roller bearing illustrated, the method has useful applications in other configurations. For example, these other configurations include the center of a ring-shaped disk or even the utilization of several ring-shaped sections.

SUMMARY

Disk-shaped machine parts are provided with a densified section of material in the shape of a ring before they are hardened. Processing is done by pressing or rolling and makes it possible to harden with low distortion, after which only minor finishing work is required.

What is claimed is:

1. A method for making hardened parts such as a rotary disk for axial roller bearings comprising an annular ring shaped body and a circumferentially extending flange extending angularly relative to the body, consisting of the steps of forming the disk to the desired shape in the soft state, densifying only one annular ring shaped section of the ring shaped body adjacent the flange by cold rolling or pressing, and thereafter hardening the entire disk.

* * * * *